(12) United States Patent
Corvasce

(10) Patent No.: US 6,279,633 B1
(45) Date of Patent: *Aug. 28, 2001

(54) TIRE WITH EPDM-BASED COMPONENT

(75) Inventor: Filomeno Gennaro Corvasce, Mertzig (LU)

(73) Assignee: The Goodyear Tire & Rubber Company, Akron, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/274,171

(22) Filed: Mar. 23, 1999

(51) Int. Cl.$^7$ ..................................................... B60C 13/00
(52) U.S. Cl. ........................................... 152/525; 152/524
(58) Field of Search ............................... 152/523, 524, 152/525, DIG. 12; 524/492

(56) References Cited

U.S. PATENT DOCUMENTS

| | | | |
|---|---|---|---|
| 3,443,619 | * 5/1969 | Kindle | 152/525 |
| 4,801,641 | 1/1989 | Ogawa et al. | 524/426 |
| 5,386,865 | * 2/1995 | Sandstrom et al. | 152/525 |
| 5,580,919 | * 12/1996 | Agostini et al. | 524/492 |
| 5,929,157 | * 7/1999 | Matsuo | 524/492 |
| 5,988,248 | * 11/1999 | Sandstrom | 152/525 |

FOREIGN PATENT DOCUMENTS

| | | | |
|---|---|---|---|
| 4438712 | 5/1996 | (DE) | C08L/23/16 |
| 0547344 | 10/1992 | (EP) | C08L/23/16 |
| 0845493 | 11/1997 | (EP) | C08K/5/54 |

\* cited by examiner

Primary Examiner—Geoffrey L. Knable
(74) Attorney, Agent, or Firm—Henry C. Young, Jr.

(57) ABSTRACT

The invention relates to a tire having a sidewall component of an EPDM-based rubber composition prepared with specified precipitated silica reinforcement and an organosilane disulfide material. In one aspect, such rubber composition may be exclusive of carbon black and may thereby be of color other than black.

2 Claims, 1 Drawing Sheet

TIRE WITH EPDM-BASED COMPONENT

FIELD

The invention relates to a tire having a sidewall component of an EPDM-based rubber composition prepared with specified precipitated silica reinforcement and an organosilane disulfide material. In one aspect, such rubber composition may be exclusive of carbon black and may thereby be of color other than black.

BACKGROUND

It is often desired to use an EPDM rubber (ethylene/propylene/non-conjugated diene-based rubber) for various tire components, such as a sidewall component, primarily because it typically has superior resistance to ozone degradation. However, EPDM elastomers are of limited usefulness for such purposes, primarily because of their typically low resistance to cut growth propagation.

The problem is compounded where it may be desired to provide a tire component of a non-black colored rubber composition so that, therefore, carbon black is not suitable for the rubber reinforcement.

Accordingly, it is desired to prepare a tire component which has the desirable age resistant properties of EPDM yet with acceptable cut growth resistance, particularly for EPDM-based rubber compositions which do not contain carbon black reinforcement.

In practice, it is recognized that precipitated silica typically has only a limited ability for reinforcing elastomers, as compared to carbon black, without a presence of a silica coupling agent such as, for example, an organosilane polysulfide which contains at least about 3.5 sulfur atoms in its polysulfidic bridge While, in practice, it is recognized that precipitated silica, in combination with an organosilane disulfide, has been used for reinforcement of diene-based elastomers for use as tire components, it is usually accompanied by adding free sulfur, or at least additional free sulfur, at some place in the rubber composition formulation. It is believed that this is well known to those having skill in such art.

It is to be appreciated that an organosilane disulfide, with its relatively strong sulfur-to-sulfur bonds, is not a good sulfur donor for rubber processing purposes, particularly as compared to an organosilane polysulfide which has at least 3.5 sulfur atoms in its polysulfidic bridge.

Accordingly, by itself, an organosilane disulfide would not ordinarily be considered a silica coupling agent for coupling a precipitated silica to a diene-based elastomer.

Further, a utility of an organosilane disulfide would considered to be very limited, if at all, in an EPDM rubber composition because of (1) its relative ineffectiveness as a sulfur source for coupling to carbon-to-carbon double bonds of an elastomer and, further (2) the relatively small amount of carbon-to-carbon double bonds available in an EPDM elastomer.

In practice, it is sometimes desired to color a portion of a sidewall to add some color other than black, albeit primarily for cosmetic reasons.

An inherent difficulty in providing such colored components for a tire is providing a non-carbon reinforced rubber composition with suitable properties for a tread sidewall.

In the description of this invention, the term "phr" is used to specify amounts of materials or ingredients in a rubber, or elastomer, composition in terms of parts by weight of such ingredient per 100 parts by weight of elastomer(s).

Also, in the description of this invention, the terms "rubber" and "elastomer" may be used interchangeably as well as rubber composition and rubber compound unless otherwise indicated.

STATEMENT AND PRACTICE OF THE INVENTION

In accordance with this invention, a tire is provided having a sidewall component of a rubber composition which is comprised of, based on 100 parts (phr) by weight elastomer, (A) about 30 to about 50 phr of EPDM, about 20 to about 40 phr of natural cis 1,4-polyisoprene rubber and about 20 to about 40 phr of cis 1,4-polybutadiene (B) about 30 to about 50 phr of reinforcing filler selected from precipitated silica and carbon black which contains from about 80 to about 98, alternately about 100 percent of said silica; wherein said precipitated silica has a BET surface area in a range of about 110 to about 130 $m^2/g$ and (C) a liquid organosilane disulfide having from 2 to 4, with an average of from 2 to 2.6, sulfur atoms in its polysulfidic bridge.

Accordingly, in one aspect of the invention, the reinforcing filler for the sidewall component is precipitated silica in absence of, or exclusive of, carbon black.

In further accordance with this invention, a tire is provided with at least one component of a non-black colored rubber composition which contains a non-black colorant pigment; wherein said reinforcing filler for said rubber composition is precipitated silica exclusive of carbon black.

In additional accordance with this invention, a tire is provided with a sidewall having at least a portion of said sidewall comprised of said rubber composition which preferably contains reinforcing filler as a precipitated silica exclusive of carbon black. In practice, such tire's sidewall component portion contains an inorganic coloring pigment of a color other than black.

A significant aspect of this invention, for said tire component and particularly for said sidewall component, is considered herein to be an innovative combination of (1) an EPDM-based rubber composition (2) a specified precipitated silica and (3) a liquid organosilane disulfide material, and alternatively (4) such component containing filler reinforcement exclusive of carbon black.

It is considered herein that a precipitated silica for use in this invention is limited to a BET surface area in a range of about 110 to about 130 $m^2/g$.

It is considered herein that a liquid organosilane disulfide material with an average of from 2 to about 2.6 sulfur atoms in its polysulfidic bridge is to be used in the rubber composition for this invention because it tends to cause less modulus increase and, also creates less processing viscosity increase during mixing of the rubber composition than an organosilane polysulfide with an average of at least 3.5 sulfur atoms in its polysulfidic bridge Examples of such organosilane disulfide materials are, for example, bis-(3-alkoxy-silyl-alkyl) polysulfide having an average of from 2 to 2.6 sulfur atoms in its polysulfidic bridge.

Representative of such disulfides are, for example, bis-(3-ethoxysilylpropyl) disulfide and bis-(3-methoxysilylpropyl) disulfide.

Various colorant pigments can be used in the practice of this invention. In one aspect, such pigments should be chemically inert insofar as typical ingredients for the rubber composition are concerned. Typically, such ingredients are inorganic materials. Representative of such pigments are, for example, titanium dioxide as a typical white colorant, as well as other colorants as, for example, diarylide yellow pigment as a yellow colorant.

The EPDM terpolymers are polymerized from ethylene, propylene, and a small percentage of a non-conjugated diene which provides unsaturation in side chains pendent from the saturated "backbone". EPDM can be vulcanized with peroxides, but the small amount of unsaturation also permits conventional sulfur vulcanization. EPDM's with larger amounts of carbon-to-carbon unsaturation provide generally faster curing terpolymer elastomers, and they can be blended with other rubbers to impart resistance to weathering and other degradation Typical non-conjugated dienes are, for example, dicyclopentadiene, 1,4-hexadiene and ethylidene norbornene.

The non-conjugated diene contents of EPDM's vary with the individual grades of the terpolymer. It is usually in the range of about 2 to about 5 weight percent and faster curing EPDM's may have a slightly higher content of the non-conjugated diene.

The composition of commercial EPDM elastomers typically contain about 60 to 85, usually about 65 to 75, mole percent units derived from ethylene. Higher molecular weight grades are sometimes preferred.

EPDM terpolymer elastomers' and their preparation are well known to those having skill in such art and they are usually simply referred to as "EPDM's".

As hereinbefore presented, the sidewall is an EPDM-based rubber composition composed of an EPDM, natural rubber and cis 1,4-polybutadiene rubber.

In practice, up to about 15 phr of an additional conjugated diene-based elastomer may be added to the sidewall rubber composition, particularly elastomers selected from isoprene/butadiene rubber and trans 1,4-pollybutadiene rubber.

BRIEF DESCRIPTION OF THE DRAWING

For a further understanding of the invention, a drawing is provided (FIG. 1) which depicts a perspective section of a tire (1).

In particular, the drawing shows a tire (1) with a sidewall portion (2) and tread portion (3). In the sidewall portion (2), raised yellow letters (4) are formed during the vulcanization of the tire. The raised yellow letters (4) are of a rubber composition of this invention which is exclusive of carbon black and which contains a yellow colored pigment together with precipitated silica reinforcement provided in combination with a bis-(3-triethoxysilylpropyl) disulfide material having an average of about 2.4 sulfur atoms in its polysulfidic bridge The siliceous pigments preferably employed in this invention are precipitated silicas such as, for example, those obtained by the acidification of a soluble silicate, e.g., sodium silicate or a combination of sodium silicate and aluminate (a co-precipitation of silica and aluminum) to create an aluminum doped precipitated silica. The term "precipitated silica" is intended to include such aluminum doped precipitated silicas.

Figure 1:
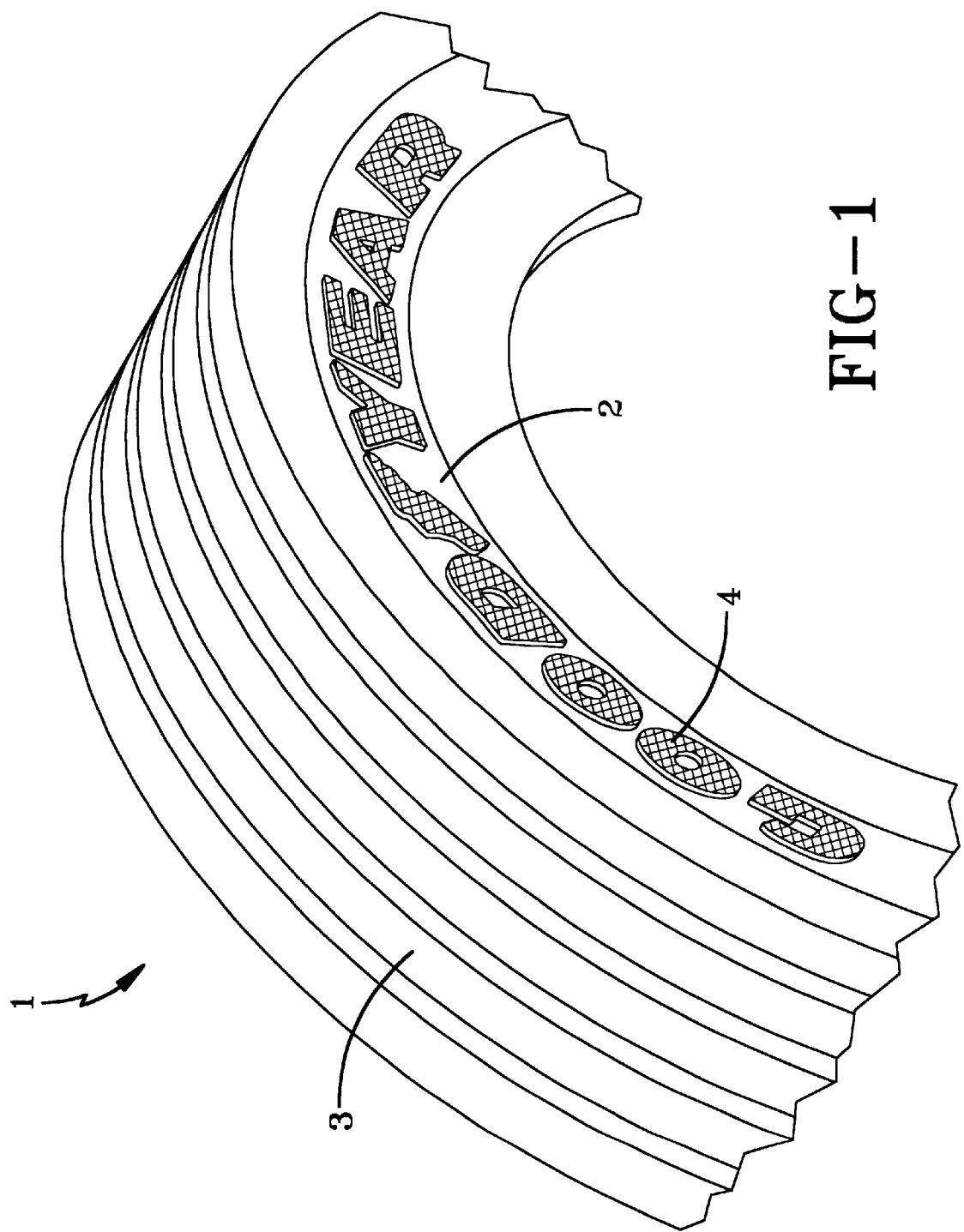

A BET method of measuring the surface area of the precipitated silica is based upon utilization of nitrogen gas and may be found, for example, in the *Journal of the American Chemical Society*, Volume 60, page 304 (1930).

The specific silica to be used is required to a BET value, for example, in a range of about 100 to about 130, and usually about 110 to about 120 $m^2/g$. A measure of a silica's surface by BET (nitrogen based test) method is well known to those having skill in such art.

An examples of a commercially available precipitated silica for use in this invention is Zeosil, 1115MP from Rhone Poulenc.

It is readily understood by those having skill in the art that the rubber composition of the sidewall rubber would be compounded by methods generally known in the rubber compounding art, such as mixing the various sulfur-vulcanizable constituent diene polymers with various commonly used additive materials such as, for example, curing aids, such as sulfur, activators, retarders and accelerators, processing additives, such as oils, resins including tackifying resins, and plasticizers, pigments, fatty acid, zinc oxide, waxes, antioxidants and antiozonants, peptizing agents and reinforcing fillers such as, for example, silica. As known to those skilled in the art, depending on the intended use of the sulfur vulcanizable and sulfur vulcanized compounds or tread compounds, the additives mentioned above are selected and commonly used in conventional amounts Typical amounts of tackifier resins, if used, comprise about 0.5 to about 10 phr, usually about 1 to about 5 phr. Typical amounts of processing aids comprise about 1 to about 80 phr. Such processing aids can include, for example, naphthenic, and/or paraffinic processing oils or plasticizer. Typical amounts of fatty acids, if used, which can include stearic acid comprise about 0.5 to about 4 phr. Typical amounts of zinc oxide comprise about 2 to about 5 phr. Typical amounts of peptizers comprise about 0.1 to about 1 phr. Typical peptizers may be, for example, pentachlorothiophenol and dibenzamidodiphenyl disulfide The vulcanization of the rubber composition for this invention is conducted in the presence of a sulfur vulcanizing agent. Examples of suitable vulcanizing agents include paraffinic and napthenic oil intended grader. Usually the vulcanization agent in an amount of about 1.5 to about 2.5 phr may be used.

Various accelerators may be used to control the time and/or temperature required for vulcanization and to improve the properties of the vulcanizate. Sometimes a retarder might also be used to control the vulcanization on-set.

The tire can be built, shaped, molded and cured by various methods which are known or apparent to those having skill in such art.

The rubber composition, or compound, for the tire sidewall may be prepared, for example, by mixing the ingredients in several sequential non-productive stages (without the sulfur and associated accelerator(s) curatives together with antidegradant(s)) to temperatures of about 170° C. followed by a final productive (with the sulfur curative) mixing stage to a temperature of about 115° C. in which the curatives and antidegradants are added. The use of sequential, non-productive mixing stage(s) followed by a productive mixing stage for mixing rubber compositions is well known to those having skill in such art. An internal rubber mixer (Banbury type) is typically used. The resulting rubber compounds may then be extruded to form components such as, for example, sidewall or colored rubber strips which, in turn, may be built onto a tire carcass and the resulting assembly vulcanized in a suitable mold at a temperature of about 150° C. to form a tire.

EXAMPLE I

Rubber compositions are prepared which are devoid of carbon black and are referenced herein as Samples B and C. One rubber composition is prepared as a control which contains carbon black reinforcement and is referred to herein as Control Sample A.

The composition for the experiments are shown in the following Table 1.

For the rubber composition, the ingredients are first mixed in at least one non-productive mixing stage for about 6 minutes to a temperature of about 170° C. The non-productive mix stages refer to the mixing of the ingredients without the curatives such as sulfur and vulcanization accelerators. The term "non-productive" mixing is well known to those having skill in such art. Then the curatives are mixed in a final mixing stage for about 2 minutes to a temperature of about 110° C.

TABLE 1

|  | Sample A Control | Sample B | Sample C |
|---|---|---|---|
| Non-productive Mixing |  |  |  |
| EPDN oil extended[1] | 40 | 40 | 40 |
| Cis 1,4-polybutadiene[2] | 30 | 30 | 30 |
| Natural rubber[3] | 30 | 30 | 30 |
| Silica[4] | 0 | 46 | 40 |
| Organosilane disulfide[5] | 0 | 3 | 0 |
| Carbon black[6] | 50 | 0 | 0 |
| Zinc Oxide | 3 | 3 | 3 |
| Titanium dioxide[7] | 0 | 40 | 0 |
| Oil | 16 | 16 | 16 |
| Yellow colorant pigment[8] | 0 | 4.5 | 0 |
| Productive Mixing |  |  |  |
| Sulfur curative | 2.1 | 2.1 | 2.1 |
| Accelerators[9] |  |  |  |

[1]EPDM rubber as ROYALENE X3114 trom the Uniroyal Chemical Company composed of ethylene-propylene ethylidene norbornene rubber with paraffinic oil in an amount of 20 phr of the oil. The EPDM is reported above as 40 phr based upon its dry weight.
[2]Polybutadiene elastomer as BUDENE® 1207 from The Goodyear Tire & Rubber Company.
[3]Natural cis 1,4-polyisoprene rubber.
[4]Silica as Zeosil 1115HP from Rhone Poulenc.
[5]Liquid bis-(3-ethoxysilylpropyl) disulfide material as Si-266 from Degussa AG understood to have an average of about 2.4 sulfur atoms in its polysulfidic bridge.
[6]N347 carbon black.
[7]Titanium dioxide pigment as Ti Pure Biograde DuPont de Numeours.
[8]Yellow colorant pigment as Stan-Tone D-1102 diarylide yellow from the Harwick Chemical Company.
[9]Accelerators and tackifying resins have been added and adjusted for the different formulations. The tackifying resins used in the yellow formulations did not affect the yellow color.

EXAMPLE II

The rubber compositions of Example I were cured for about 18 minutes to a temperature of about 150° C. Various physical properties of the rubber compositions were measured and reported in the following Table 2

TABLE 2

| Property | Exp A Control | Exp B | Exp C |
|---|---|---|---|
| 300% Modulus (MPa) | 5.05 | 3.3 | 3.7 |
| Tensile (MPa) | 12.0 | 9.2 | 8.4 |
| Elongation (%) | 600 | 715 | 600 |
| Rebound (23° C.) | 56 | 51.1 | 62 |
| Hardness, Shore A | 54.5 | 53.5 | 50 |
| Number of cycles until critical cracks propagated at 40% cyclic strain[1] | 25,000 | 250,000 | 250,000 |

It can be readily seen from Table 2 that the rubber compositions represented by experimental Samples B and C were substantially more crack resistant than that of the Control Sample A which is a desirable property for a tire sidewall. Samples utilized a selected silica instead of carbon black reinforcement.

Further, it is seen that the Sample B rubber composition, which utilized both the selected silica and the organosilane disulfide material, also exhibited a significantly greater elongation and a significantly reduced modulus 300% which is desirable for a reduced stored energy in the sidewall at large strains. By achieving lower modulus 300%, less energy is available to allow cracks to propagate.

EXAMPLE III

Pneumatic tires of size 215/40ZR16 were individually prepared having raised yellow colored sidewalls of the rubber composition Samples B and C of Example I similar to that of FIG. 1 with tire sidewalls of compositions Sample A and Sample B, respectively.

In particular, a Control tire X was prepared with raised black letters and sidewall of Sample A, the carbon black-reinforced, black colored rubber composition.

A tire Y was prepared with raised yellow letters of Sample C and a sidewall of Sample A.

Durability tests for the tires X and Y confirmed the laboratory tests for Samples A and B shown in Table 2 of Example I.

In particular, no crack initiations and propagations were observed in the raised yellow letters on the sidewalls of tire Y.

However, it was observed that cracks were initiated at the top of the raised letters for Control tire X where the stress concentrations were higher and a portion of such cracks propagated circumferentially around the sidewall of the tire.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a sidewall component of a rubber composition which is comprised of, based on 100 parts (phr) by weight elastomer (A) about 30 to about 50 phr of EPDM, about 20 to about 40 phr of natural cis 1,4-polyisoprene rubber and about 20 to about 40 phr of cis 1,4-polybutadiene (B) about 30 to about 50 phr of reinforcing filler as precipitated silica to the exclusion of carbon black; wherein said precipitated silica has a BET surface area in a range of about 110 to about 130 m$^2$/g and (C) a liquid organosilane polysulfide comprising bis-(3-ethoxysilylpropyl) polysulfide, or bis-(3-methoxysilylpropyl) polysulfide, having an average of from 2 to 2.6 sulfur atoms in its polysulfidic bridge; wherein said EPDM contains about 60 to about 85 mole percent units derived from ethylene and contains about 2 to about 5 percent units derived from a non-conjugated diene and wherein said non-conjugated diene comprises 1,4-hexadiene or ethylidene norbornene.

2. The tire of claim 1 wherein up to 15 phr of a non-conjugated diene-based elastomer is added to said rubber composition selected from isoprene/butadiene rubber and trans 1,4-polybutadiene rubber.

* * * * *